Dec. 3, 1968   M. WEBER   3,413,841
LEAK TESTING METHOD AND APPARATUS FOR CONTAINERS
Filed Oct. 10, 1966   3 Sheets-Sheet 1

INVENTOR

Max Weber

By: Kelman and Berman
Agents

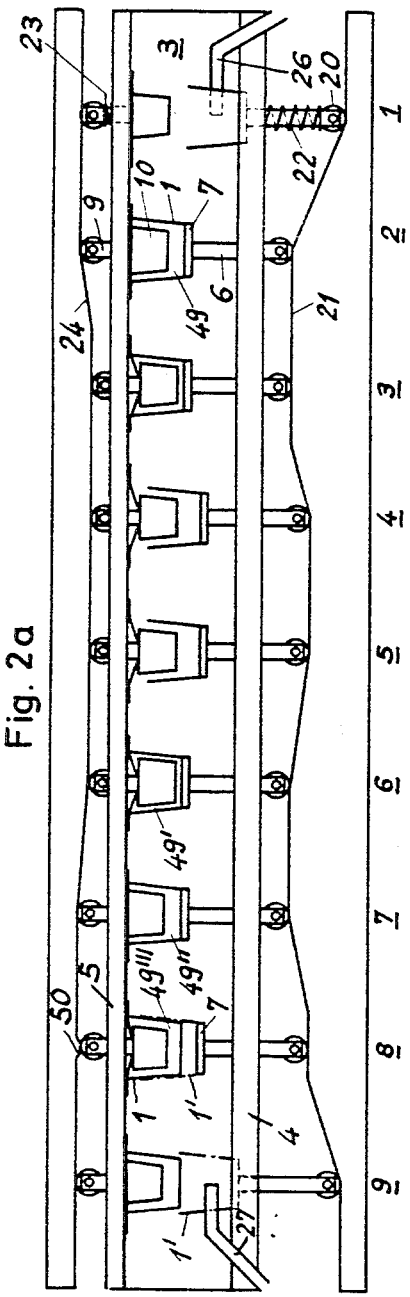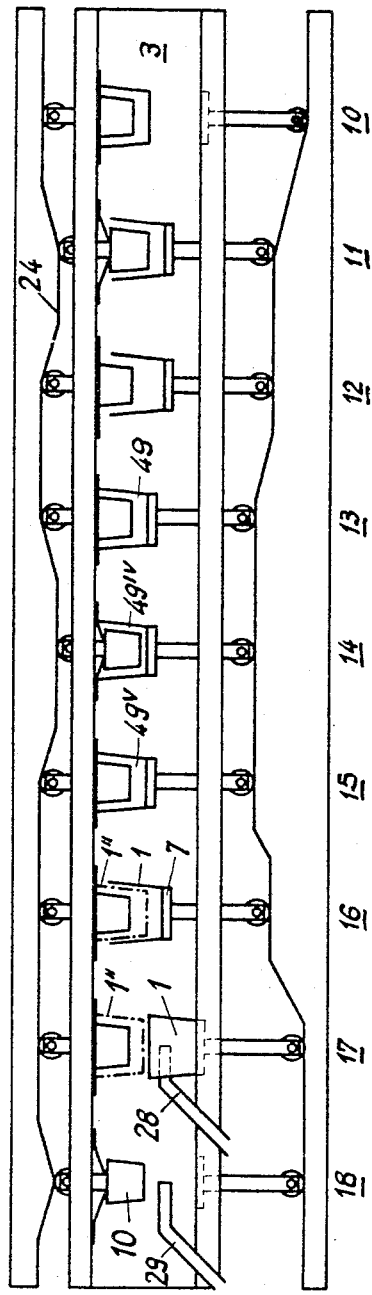

Dec. 3, 1968 M. WEBER 3,413,841
LEAK TESTING METHOD AND APPARATUS FOR CONTAINERS
Filed Oct. 10, 1966 3 Sheets-Sheet 3

INVENTOR

Max Weber

By: Kelman and Berman
Agents

United States Patent Office 3,413,841
Patented Dec. 3, 1968

3,413,841
LEAK TESTING METHOD AND APPARATUS
FOR CONTAINERS
Max Weber, Buchs, Switzerland, assignor to Elcalor
A.G., Fabrik fur elektrothermische Apparate,
Aarau, Switzerland
Filed Oct. 10, 1966, Ser. No. 585,501
Claims priority, application Switzerland, Apr. 15, 1966,
5,487/66
9 Claims. (Cl. 73—45.1)

ABSTRACT OF THE DISCLOSURE

Plastic cups or bottles are tested for tightness by trapping a body of air in a small space downwardly bounded by the tested object while the latter is supported on a movable platform. The trapped air is then expanded and/or compressed, and the resulting air leakage into or out of the space causes defective objects to cling to the testing apparatus or to drop from it depending on the specific sequence of air pressure changes when the supporting platform is withdrawn, whereas acceptable objects show the opposite behavior.

---

Figure 1:
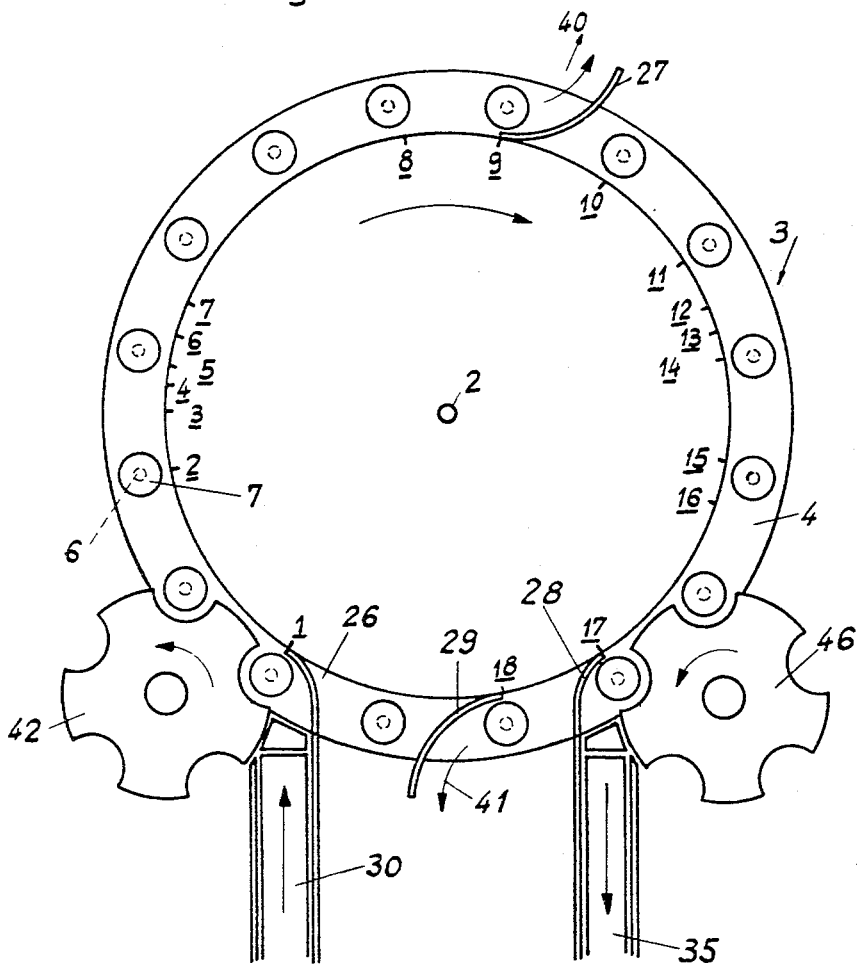

This invention relates to the testing of cups, bottles, and other containers for leaks in the walls thereof, and particularly to a method of testing the containers and to apparatus for performing the method.

It is known to seal the cavity of a container of the type described and thereafter to establish a pressure differential between the sealed cavity and the ambient air by either admitting compressed air to the cavity or by evacuating the same. Subsequent spontaneous reduction of the pressure differential is indicative of a leak through the container wall. The pressure differential that can be established is limited by the mechanical strength of the container, and can only be small when thin-walled plastic bottles or like containers are to be tested. Very sensitive pressure gages are therefore needed to detect a pressure change in the known method, and the pressure change must be observed over a relatively long period. The method inherently relies on valves for temporarily connecting the tested container to a source of compressed air or vacuum, and its results are fatally affected by any leakage in the valves. An automatic sorting apparatus for separating leaky containers from tight containers at a reasonable output rate according to the known method thus requires a relatively large number of expensive sensitive pressure gages and elaborate valving.

The object of the invention is the provision of a method which permits the sorting of containers according to their tightness without the use of pressure gages, valves, and extraneous sources of compressed gas or vacuum in a simple manner at a high output rate and with great reliability.

According to the method of this invention, force is exerted against each tested container in an upward direction to move the container into a position of sealing engagement of the rim around its aperture with a testing receptacle in such a manner that one face of the container wall and the receptacle form a sealed chamber in which a body of atmospheric air is trapped while the other face of the container wall is exposed to ambient air. A portion of the testing receptacle which bounds the chamber is then moved relative to the trapped air body to establish a pressure differential between the body and the ambient air. When the above-mentioned force is relaxed thereafter, some containers are retained in a position of sealing engagement with the receptacle whereas others drop by gravity. As will become apparent hereinafter, details of structure and of operation determine whether the retained or the dropped containers are the defective ones, but the leaky and tight containers are separated from each other, when the retained and dropped containers are separately collected.

The apparatus employed for carrying out the method includes a support on which at least one platform is mounted for vertical movement. An upwardly directed carrier face of the platform is adapted to carry the container to be tested vertically toward and away from a receptacle means mounted above and including sealing means for engagement with the rim of the tested container so that a sealed chamber is jointly formed by one face of the container wall and by the receptacle means which has a portion capable of movement inward and outward of the chamber. The drive mechanism of the apparatus is connected to the platform and to the movable receptacle portion so as to actuate the afore-mentioned movements in timed sequence.

Figure 3:
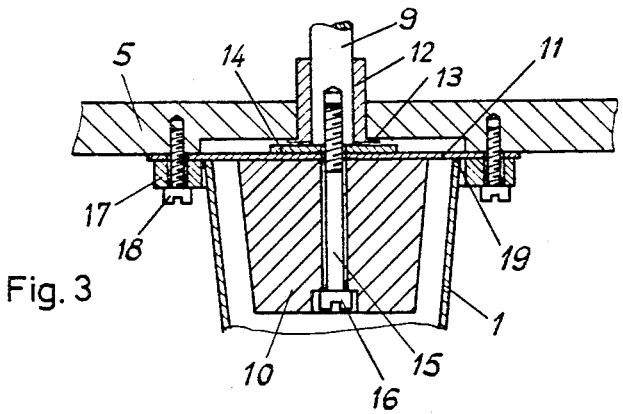
Figure 4:
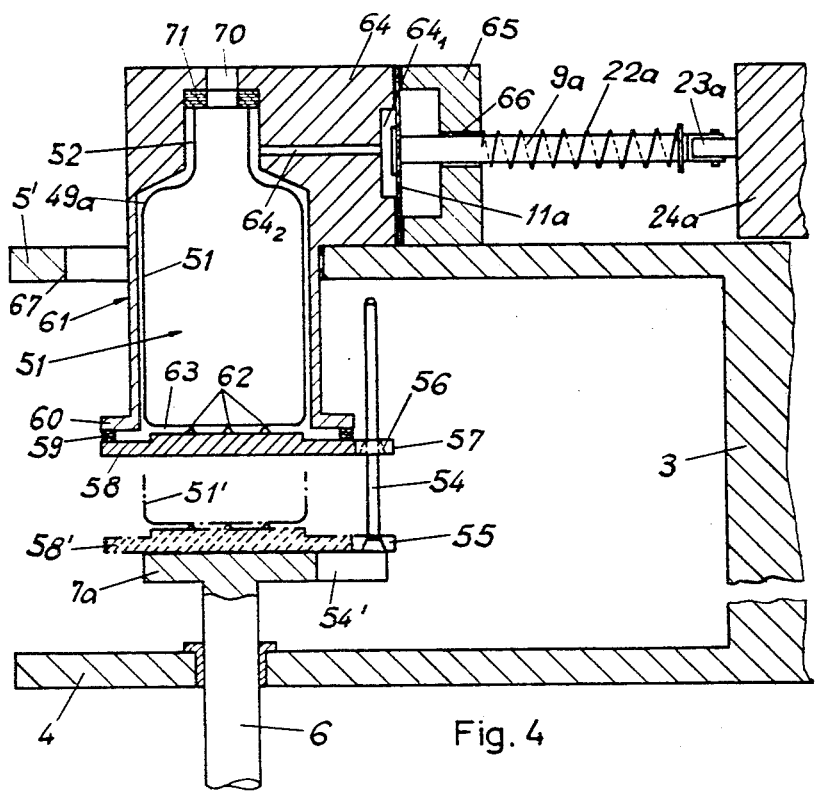

Other features, additional objects, and many of the attendant advantages of this invention will be apparent from the following detailed description of preferred embodiments when considered with reference to the attached drawing in which:

FIG. 1 shows a sorting apparatus of the invention in plan view, a portion of the apparatus being removed for a better view of its operating elements;

FIG. 2 consists of two parts, FIGS. 2a, 2b, and shows a portion of the apparatus in a developed elevational view in which some horizontal dimensions have been distorted in the interest of a clearer representation;

FIG. 3 shows a detail of the apparatus of FIG. 1 in elevational section on an enlarged scale; and FIG. 4 illustrates a modification of the apparatus of FIGS. 1 to 3 in a view corresponding substantially to that of FIG. 3.

Referring now to the drawing in detail, and initially to FIGS. 1 to 3, there is seen an automatic apparatus for sorting cups 1 according to the tightness of their walls. The apparatus has a support structure which has been largely omitted from the drawing for the sake of clarity, and on which a vertical drive shaft 2 is mounted. The shaft carries a turntable 3 which is a cylindrical disc having two flat, axially spaced, annular flanges 4, 5, the general arrangement being best seen in FIG. 4 which illustrates an otherwise modified embodiment of the invention.

Sixteen tappet rods 6 are vertically or axially slidable in the lower flange 4 in corresponding openings equiangularly spaced about the shaft 2. Their top ends carry respective circular platforms 7 dimensioned to carry the cups 1. The flange 4 is recessed about each tappet rod 6 so that the platforms 7 are flush with the top face of the flange 4 in the lowermost position of the associated rods 6. When the turntable 3 is continuously rotated by a non-illustrated electric motor connected to the shaft 2 during normal operation of the apparatus, each platform 7 moves sequentially through stations 1 to 18 about the axis of rotation. The location of these stations has been indicated realistically by reference numerals in FIG. 1, but their horizontal spacing has been distorted in FIG. 2 for convenient pictorial representation of the various positions of the operating elements.

Sixteen tappet rods 9 are axially slidable in the upper flange 5 in alignment with the rods 6. As is best seen in FIG. 3, each rod 9 carries a frusto-conical plunger 10 dimensioned to occupy a major portion, more than one half, of the cavity of a tested cup 1 when the cup is pushed upward by the associated lower tappet rod 6 and platform 7 into sealing engagement of its rim 19 with a resilient diaphragm 11 peripherally attached to the underside of the flange 5 by a clamping ring 17 and screws 18. The center of the diaphragm 11 is clamped between the top of the plunger 10 and a washer 14 by a screw 15 which passes coaxially through the plunger 10 and threadedly engages the upper tappet rod 9. The head 16 of the screw 15 is recessed in the plunger 10. The tappet rod 9 is guided in the flange 5 by a bushing 12 having a flange 13. The flange 5 and associated elements have been omitted from the showing of FIG. 1.

The stationary support structure of the apparatus, not otherwise shown in detail, includes two annular cams 21, 24 respectively arranged below the lower flange 4 and above the upper flange 5. A helical compression spring 22 on each tappet rod 6 urges the rod downward and holds a cam follower roll 20 on the rod in engagement with the face of the cam 21, only one spring 22 being shown in FIG. 2 for the sake of clarity. The upper tappet rods 9 are similarly equipped with cam follower rolls 23 which are held in engagement with the face of the cam 24 by the resiliency of the diaphragms 11 and by compression springs analogous to the spring 22, and omitted from the drawing.

Sheet metal guides 26, 27, 28, 29 are arranged on an axial level between the flanges 4, 5 to guide movement of cups 1 toward or away from the upwardly directed carrier faces of the platforms 7 in stations $\underline{1}$, $\underline{9}$, $\underline{17}$, and $\underline{18}$. As is evident from FIG. 2, the platforms 7 are received in recesses of the flange 4 in these stations, and their movement about the shaft 2 is not interfered with by the guides. A continuously moving belt conveyor 30 feeds the cups 1 to be sorted along the guide 26 into the station $\underline{1}$. The cups are sequentially centered on platforms 7 by a notched feeding wheel 42 as the platforms move through station $\underline{1}$. The vertical shaft of the wheel 42 is connected with the drive shaft 2 by sprockets and a drive chain (not shown) which ensure perfect synchronization of the rotary movements of the wheel 42 and of the turntable 3. The spacing of the peripheral notches of the wheel 42 corresponds to the spacing of the tappet rods 6 and 9.

A discharge wheel 46, identical with the wheel 42 and identically driven, cooperates with the guide 28 in station $\underline{17}$ to transfer acceptable cups to a discharge conveyor 35 which brings them to a non-illustrated packing station. The guides 27 and 29 knock defective cups from the turntable 3 at stations $\underline{9}$ and $\underline{18}$ respectively in the direction of the arrows 40, 41. They may be collected in boxes or otherwise disposed of. It will be understood that the axial height of the wheels 42, 46 and of the guides 26–29 is so small that they clear the plungers 10 and the cups 1 when held against the diaphragms 11 in all operative positions of the plungers and diaphragms.

The face of the cam 21 has horizontal portions on three levels and that of the cam 24 has horizontal portions on two levels. The several horizontal face portions of each cam are connected by obliquely inclined slopes. The manner in which operation of the sorting apparatus is controlled by the relative rotary movement of the cams 21, 24 and the turntable 3 is shown in FIG. 2.

Cups are sequentially fed to platforms 7 in station 1 while the platforms and the corresponding plungers 10 are retracted toward the associated flanges 4, 5. Each cup 1 is raised during movement to station $\underline{2}$ until its rim is pressed against the diaphragm 11 in sealing engagement. Most of the cup cavity is occupied by the plunger 10, whose bottom is much nearer to the platform 7 than to the diaphragm 11, and only a small body of air 49 at atmospheric pressure is trapped in the sealed chamber bounded by the inner face of the cup wall, the diaphragm 11 and the plunger 10.

Downward movement of the upper tappet rod 9 during movement to station $\underline{3}$ causes the central portion of the diaphragm and the plunger to move inward of the sealed chamber, thereby sharply increasing the pressure of the trapped air. If the cup is mechanically weak or has a crack, it may burst under the internal pressure, or the crack is at least widened. The platform 7 is lowered to an intermediate level during movement to station $\underline{4}$ and remains lowered during further movement to station $\underline{5}$ to permit full pressure equalization between the cavity of the cup and the ambient air. The platform 7 is raised again to its topmost level while moving toward station $\underline{6}$ while the tappet rod 9 and the attached elements remain in the lowered position assumed in station $\underline{3}$. A body of air 49', smaller than the air body 49, is trapped in the sealed chamber formed at station $\underline{6}$. It is expanded to a volume 49" at station $\underline{7}$ by upward movement of the tappet rod 9, and a gas pressure lower than atmospheric pressure is established within the cup 1.

If the cup 1 is tight, the low pressure is maintained during subsequent movement into stations $\underline{8}$ and $\underline{9}$ while the platform 7 is being lowered to its intermediate level and ultimately to its lowest level. External air pressure holds the partly evacuated cup against the diaphragm 11 even while the plunger 10 is being slightly and only instantaneously depressed by movement of the cam follower 23 over a small downward projection 50 on the cam 24. The projection helps guard against retention of a defective cup 1' on the membrane 11 by adhesion and may readily be dimensioned for reducing the vacuum within a good cup to the permissible minimum while ensuring rejection of cups having even slight leaks. Defective cups 1', as indicated in broken lines, drop to the flange 4 and are swept from the turntable by the guide 27 in station $\underline{9}$.

Cups which pass the evacuation test travel through station $\underline{10}$ and are dropped during travel to station $\underline{11}$ onto the platform 7 when atmospheric pressure is restored within the cup by descent of the plunger 10, the platform 7 being raised to its intermediate level to avoid mechanical damage to the cup by the drop. The plunger 10 is then retracted upward (station $\underline{12}$) and the platform is raised to its topmost position (station $\underline{13}$), whereby the condition at station 2 is restored, and a body 49 of air at atmospheric pressure is trapped within the cup. It is compressed to a volume $49^{IV}$ (station $\underline{14}$) by descent of the plunger 10, and compression is maintained during most of the relatively long movement (see FIG. 1) from station $\underline{14}$ to station $\underline{15}$. Shortly before the cup reaches station $\underline{15}$, the plunger 10 is retracted upwardly. The air body $49^V$ within the cup is thereby returned to atmospheric pressure if there was no leak, and a partial vacuum is established if the cup leaked during the compression test.

Station $\underline{16}$ quickly follows station $\underline{15}$. The platform 7 drops away to its intermediate position, and a tight cup 1 drops with it. It is lowered to the flange 4 in station $\underline{17}$ and is removed there from the turntable 3 to the conveyor 35 by the wheel 46 and the guide 28. A cup 1" which passed the vacuum test at stations $\underline{7}$ to $\underline{9}$, but failed the compression test is held by vacuum against the diaphragm 11 until it reaches station $\underline{18}$ where the plunger 10 is lowered, whereby the cup 1'" is dropped to the flange 4 and discharged from the turntable 3 by the guide 29 in the direction of the arrow 41.

The apparatus illustrated in FIGS. 1 to 3 has been used successfully with a turntable 3 rotating at about 10 r.p.m. for inspecting about 160 plastic cups per minute for bursting strength, vacuum tightness and pressure tightness. It will be appreciated that the output rate may be modified within wide limits by choosing turntables having more or fewer stations, by inspecting for only one or two of the afore-mentioned properties, and by feeding more than one row of containers to the circumference of the turntable.

The high rate of output of the illustrated testing and sorting apparatus is predicated to a substantial extent on the large portion of the cup cavity which is occupied by the plunger 10 when the cup engages the diaphragm 11, leaving only a small body of air trapped in the cup. Small movements of the plunger inward and outward of that body are therefore sufficient to establish significant pressure differentials between the trapped air and the ambient atmosphere.

When containers having small apertures, such as narrow-necked bottles, are to be tested for one or more of the properties mentioned, it is preferred to modify the apparatus of FIGS. 1 to 3 as shown in FIG. 4 which illustrates but a single station of the modified apparatus which does not require a plunger to enter the bottle.

The turntable 3 is provided with a lower flange 4 and an upper flange 5' which differs from the flange 5 by being provided with a relatively large opening opposite each tappet rod 6 and the platform 7a mounted on the rod. The rod 6 is moved up and down by a non-illustrated stationary cam identical with the cam 21 when the turntable 3 rotates. A bracket 54' projecting from the platform 7a in a radially inward direction carries two circumferentially spaced locating pins 54 of which only one is seen in the drawing. The pins 54 have conically enlarged bottom portions 55 and are slidably received in corresponding conically tapering bores 56 in a bracket 57 of a plate 58 which is held in a horizontal position by the pins 54 and is vertically slidable along the same between the position of the plate shown in fully drawn lines and the position 58' indicated in broken lines in which the plate rests on the platform 7a.

A head assembly 64 rests on the flange 5' to which it is fixedly attached and has an integral bell portion 61 coaxial with the tappet rod 6 which extends downward through the aforementioned large opening in the flange 5'. A flange 60 about the bottom opening of the bell 61 is sealed to the plate 58 by an annular resilient gasket 59. Pointed spacers 62 upwardly project from the plate 58 to support a bottle 51 to be tested while avoiding area contact between the bottom 63 of the bottle and the plate 58.

The dimensions of the bottle 51 and of the bell 61 are matched in such a manner that the rim around the opening in the neck 52 of the bottle is firmly sealed to a resilient ring 71 attached to the bell 61 about the orifice of a vent duct 70 which connects the bottle cavity with the ambient atmosphere while a relatively small body of air 49a is trapped in the sealed chamber formed by the outer face of the bottle wall and various surfaces of the receptacle formed by the bell 61, other elements of the head assembly 64, and by the plate 58.

A narrow duct $64_2$ in the head assembly 64 connects the air body 49a with a recess $64_1$ in the head assembly which is outwardly sealed by a resilient diaphragm 11a. The diaphragm is held in sealing engagement with the head assembly 64 by a cap 65. A tappet rod 9a passes horizontally through a bore 66 in the cap 65 and carries a cam follower roller 23a held in contact with a disc cam 23a on the stationary supporting structure of the apparatus by a helical compression spring 22a.

The apparatus partly illustrated in FIG. 4 operates in the same manner as described hereinabove with reference to FIG. 2. The positions of the bottle 51 and of the tappet rods 6, 9a shown in FIG. 4 correspond to those of the cup 1 and of the rods 6, 9 in station 8 (FIG. 2a). The plate 58 and the bottle 51 are held in the illustrated position by the partial vacuum in the air space 49a. If the bottle had a leak in its wall it would have dropped with the plate to the positions indicated at 51' and 58' respectively. It will be appreciated that the vertical spacing of the flanges 4 and 5a is sufficient so that the top of the bottle 51' is downwardly offset from the flange 60 in the lowermost position of the platform 7a, and the rejected bottle may be swept from the turntable by stationary guides in a manner evident from FIG. 1. The pins 54 are out of reach of the guides.

The bottle sorting machine shown in FIG. 4 also is capable of very high output rates because of the small air volume 49a trapped between the outer face of the bottle wall and the receptacle or bell 61. Relatively minor movements of the small diaphragm 11a cause substantial pressure changes in the trapped air. The large diameter of the flange 60 causes the pressure differential between the air space 49a and the atmospheric air to be applied to a large area, thereby increasing the sensitivity of the apparatus. This is achieved without unduly increasing the volume of trapped air by making the radial width of the annular space between the flange 60, the gasket 59, and the plate 58 substantially greater than the axial spacing of the flange 60 and the plate 58.

It is an important feature of this invention that the air space 49a is but a small fraction of the bottle capacity.

Those skilled in the art will readily modify the illustrated, fully automatic embodiments of the invention for semi-automatic operation which is adequate for plants of small output or for short production runs. It is preferred under such circumstances to make the turntable 3 stationary and to rotate the cams 21, 24 or 24a about the shaft 2 so that individual cups or bottles may be fed to one or a few stations, the entire testing cycle or any desired portion thereof is performed at the same station, and the tested containers are removed manually and collected separately according to their performance. For even more modest requirements, the method of the invention may be performed manually by an operator who shifts the tappet rods 6, 9 or 9a in the required timed sequence.

It should be understood, therefore, that the foregoing disclosure relates only to preferred embodiments of the invention, and that it is intended to cover all changes and modifications of the examples of the invention herein chosen for the purpose of the disclosure which do not constitute departures from the scope and spirit of the invention set forth in the appended claims.

What is claimed is:

1. An apparatus for sorting tight and leaky containers from a group of containers having a wall enclosing an outwardly open cavity and having a rim about the opening of the cavity, the apparatus comprising:
   (a) a support;
   (b) platform means defining an upwardly directed carrier face and mounted on said support for vertical movement, said platform means being adapted to carry one of said containers on said face;
   (c) receptacle means mounted on said support above said face, said receptacle means including sealing means for sealingly engaging said rim and for forming a sealed chamber with one face of said wall while permitting access of ambient air to the other face of said wall, a portion of said receptacle means being arranged for movement inward and outward of said chamber; and
   (d) actuating means operatively connected to said platform means and to said portion of said receptacle means for moving said platform means toward and away from said receptacle means, and for moving said portion of the receptacle means inward and outward of said chamber relative to said platform means while said platform means remains in a fixed vertical position on said support, and while said platform means moves relative to said support, said platform means and said portion of the receptacle means being moved by said actuating means in timed sequence.

2. An apparatus as set forth in claim 1, wherein said portion of said receptacle means includes a pliable diaphragm member, said diaphragm member closing said opening when sealingly engaging said rim.

3. An apparatus as set forth in claim 1, wherein said support includes turntable means having an axis and said actuating means includes cam means, driving means for causing relative rotary movement of said turntable means and of said cam means about said axis, said platform means and said receptacle means being mounted on said turntable means for movement therewith relative to said cam means, cam follower means on said platform means and said portion of said receptacle means, and means holding said cam follower means in engagement with said cam means during said rotary movement.

4. An apparatus as set forth in claim 3, wherein a container carried on said platform means moves between a first position and a second position during said vertical movement of the platform means, the apparatus further comprising first guide means on said support for selectively removing a container from said platform means in a first direction during said rotary movement when the container is in said first position, and second guide means on said support for selectively removing a container from said platform means in a second direction during said rotary movement when the container is in said second position.

5. An apparatus as set forth in claim 3, wherein said sealing means include a pliable diaphragm member, said diaphragm member constituting said portion of said receptacle means, and plunger means mounted on said diaphragm member and projecting therefrom toward said platform means for movement therewith.

6. An apparatus as set forth in claim 3, wherein said receptacle means include downwardly open bell means vertically aligned with said platform means and being formed with a duct therethrough in an upward direction, said sealing means being annular about said duct; a plate member; guide means on said platform means for guiding said plate member between a first position in which said plate member is superimposed on said carrier face and a second position in which said plate member closes the downwardly open side of said bell means, and seal means for forming a tight seal between said bell means and said plate member in said second position of the plate member.

7. An apparatus as set forth in claim 6, wherein said seal means include an annular flange outwardly projecting from said bell means and an annular resilient member interposed between said flange and said plate member, said flange, said resilient member, and said plate member in said second position of the latter defining an annular space axially bounded by said flange and said plate member and having a radial width substantially greater than the axial spacing of the flange and the plate member.

8. A method of sorting tight and leaky containers from a group of containers having a wall enclosing an outwardly open cavity and having a rim about the opening of the cavity, which comprises:
 (a) exerting a force against each of said containers in an upward direction to move the container into a sealing position relative to a receptacle means, said rim in said position of the container sealingly engaging said receptacle means, and a face of said wall in said cavity and said receptacle means forming a sealed chamber trapping a body of atmospheric air while an outer face of said wall is exposed to ambient air;
 (b) moving a portion of said receptacle means inward of said body of trapped air to increase tthe pressure of said trapped body, while said force is being exerted, the increased pressure being sufficient to break said container if the mechanical strength thereof is lower than a predetermined strength;
 (c) thereafter connecting said trapped body of air to the atmosphere until the pressure in said cavity is substantially equal to that of the ambient air;
 (d) moving said portion of said receptacle means outward of said chamber, while the container is again in said sealing position, to reduce the pressure of said trapped body below that of the ambient air;
 (e) relaxing said force, whereby the container, if tight, is retained in said sealing position and, if leaky, drops by gravity from said position; and
 (f) separating the retained containers from the dropped containers.

9. A method of sorting tight and leaky containers from a group of containers having a wall enclosing an outwardly open cavity and having a rim about the opening of the cavity which comprises:
 (a) exerting a force against each of said containers in an upward direction to move the containers into a sealing position relative to a receptacle means, said rim in said position of the container sealingly engaging said receptacle means, and one face of said wall and said receptacle means forming a sealed chamber trapping a body of atmospheric air while the other face of said wall is exposed to ambient air;
 (b) moving a portion of said receptacle means bounding said chamber toward a position inward of said body of trapped air to increase the pressure thereof above that of the ambient air and holding said portion in said position for a time sufficient to cause outward leakage of air from a leaky container;
 (c) thereafter moving said portion outward of said body to substantially restore atmospheric pressure in said chamber if the container is tight; and
 (d) relaxing said force, whereby tight containers drop from said sealing position and leaky containers are temporarily retained in said sealing position.

References Cited

UNITED STATES PATENTS

| 700,891 | 5/1902 | Black | 73—45.3 |
| 1,754,321 | 4/1930 | Johnson | 73—45.3 |
| 2,084,653 | 6/1937 | Preston | 73—45.1 XR |
| 2,106,407 | 1/1938 | Hensley | 73—45.3 |
| 2,880,610 | 4/1959 | McCoy | 73—49.2 |
| 3,318,137 | 5/1967 | Denlinger et al. | 73—45.3 |

FOREIGN PATENTS 117,156   1959   U.S.S.R.

S. CLEMENT SWISHER, *Acting Primary Examiner.*

JEFFREY NOLTON, *Assistant Examiner.*